(No Model.) 3 Sheets—Sheet 1.

L. SULLIVAN.
MACHINE FOR TWISTING STRAW, &c., FOR FUEL.

No. 406,153. Patented July 2, 1889.

(No Model.) 3 Sheets—Sheet 2.

L. SULLIVAN.
MACHINE FOR TWISTING STRAW, &c., FOR FUEL.

No. 406,153. Patented July 2, 1889.

WITNESSES
INVENTOR
Lawrence Sullivan
By Theo W Tyree
Attorney (No Model.) 3 Sheets—Sheet 3.
L. SULLIVAN.
MACHINE FOR TWISTING STRAW, &c., FOR FUEL.
No. 406,153. Patented July 2, 1889.
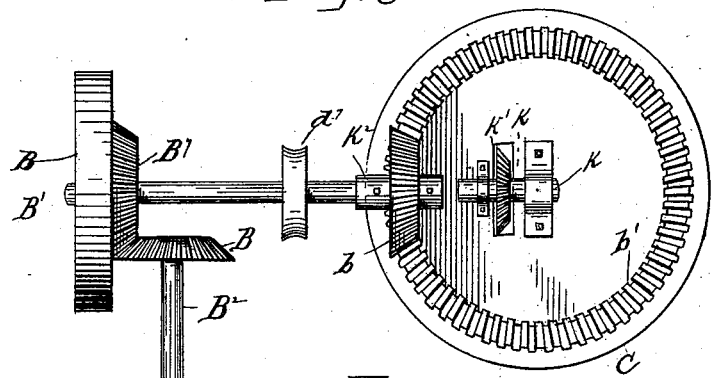
Fig. 3
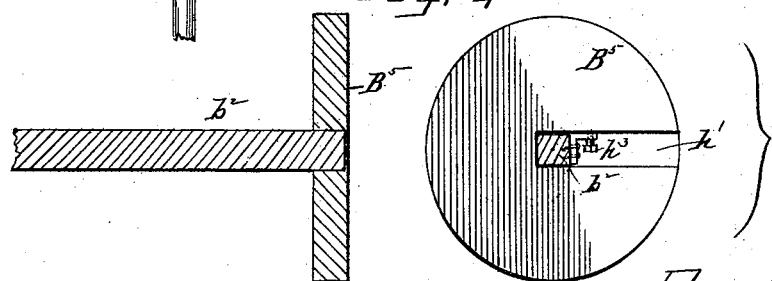
Fig. 4
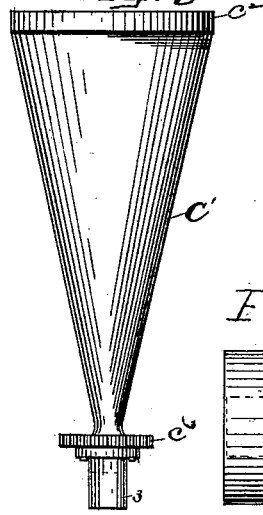
Fig. 5
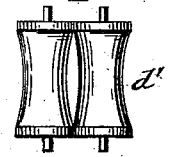
Fig. 8
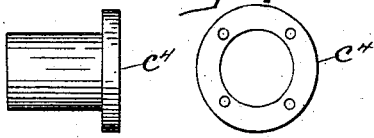
Fig. 7
Fig. 6
Witnesses
J. Stewart Bowen
Joseph A. Settle
Inventor
Lawrence Sullivan
By Theo. W. Tyrer

UNITED STATES PATENT OFFICE.

LAWRENCE SULLIVAN, OF STILLWATER, MINNESOTA.

MACHINE FOR TWISTING STRAW, &c., FOR FUEL.

SPECIFICATION forming part of Letters Patent No. 406,153, dated July 2, 1889.

Application filed December 10, 1885. Serial No. 185,214. (No model.)

*To all whom it may concern:*

Be it known that I, LAWRENCE SULLIVAN, a citizen of the United States, residing at Stillwater, in the county of Washington and State of Minnesota, have invented certain new and useful Improvements in Machines for Twisting Straw, &c., for Fuel; and I do hereby declare the following to be a full, clear, and exact description of the invention, such as will enable others skilled in the art to which it appertains to make and use the same.

My invention relates to a machine for twisting hay, straw, and flax into large ropes to be cut in short lengths and used as fuel, which machine is designed to be run by steam or horse power, and either in connection with a thrashing-machine or independently.

The object of my invention is to provide a machine that will twist a large quantity of hay or straw in a short space of time into ropes to be wound upon spools or spindles to be cut up as desired and employed as fuel. Heretofore the vast quantity of straw raised by the farmers throughout the grain-producing sections of the country has been burned in the stacks in the fields and wasted, and large tracts of wild hay are each year burned and wasted. It is by this invention designed to turn this straw and hay into fuel, thus making a great saving to the farmers. I attain this object by the mechanism of my invention, as illustrated in the accompanying drawings, in which—

Figure 1:
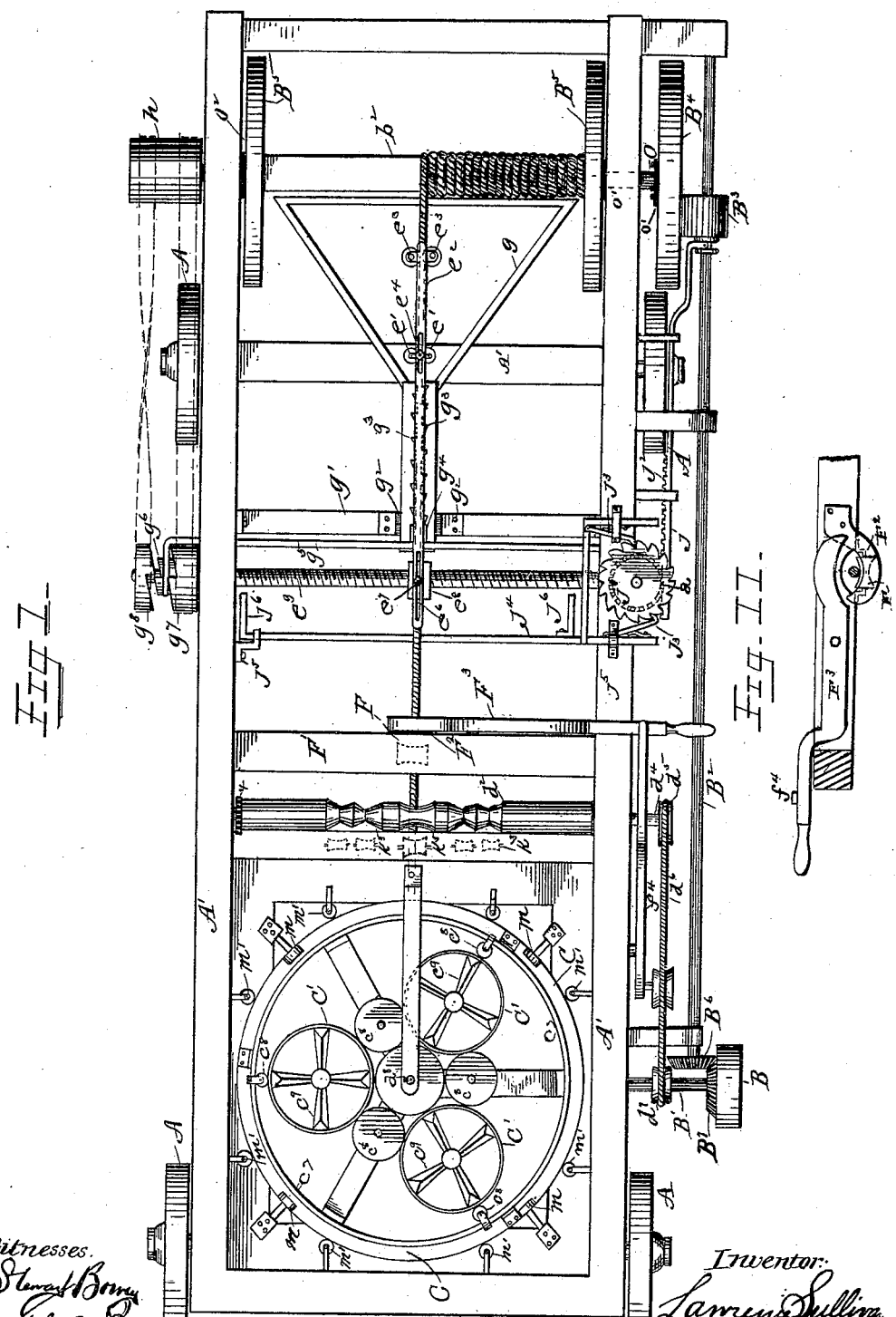
Figure 2:
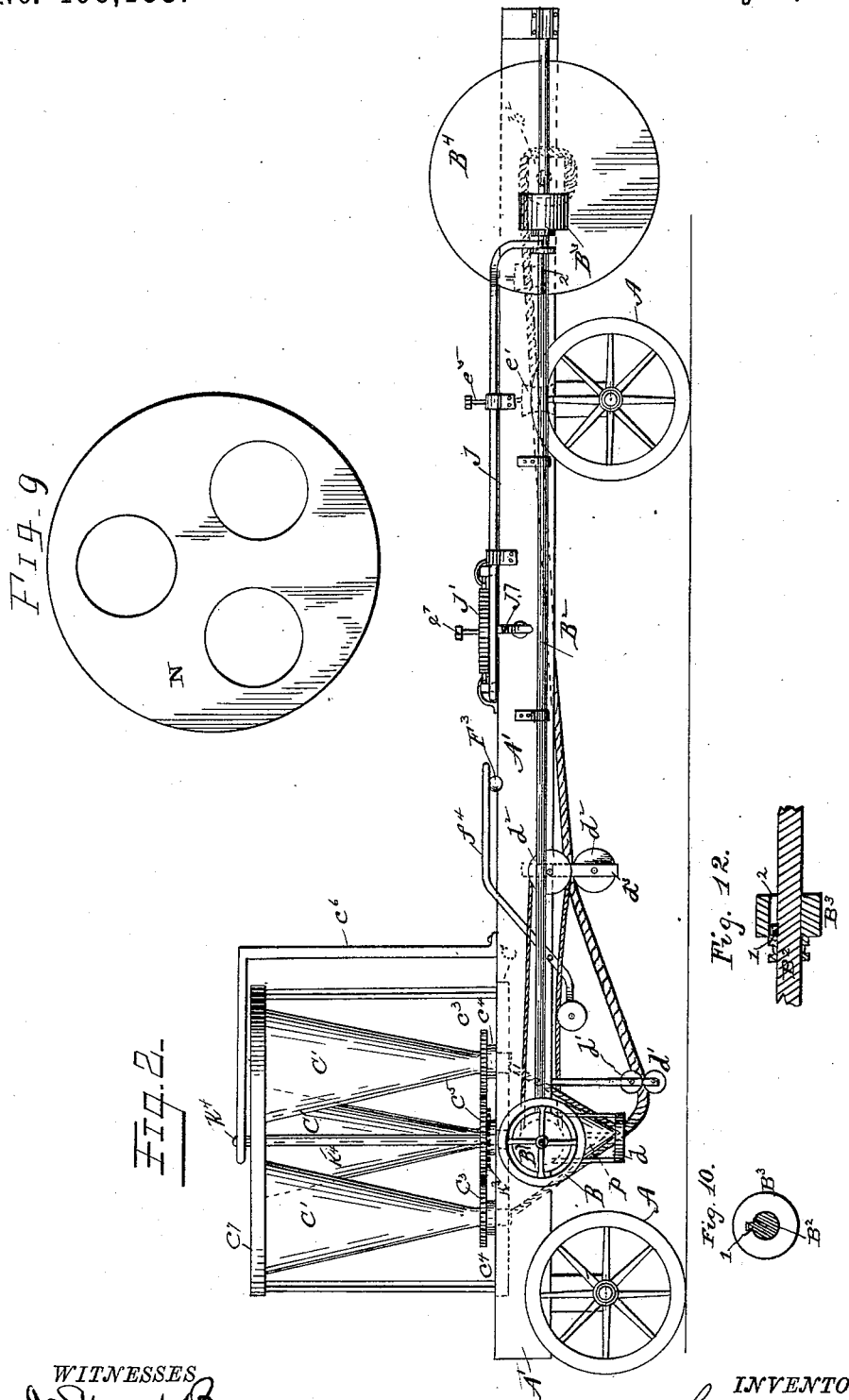

Figure 1 is a top plan view of the invention complete. Fig. 2 is a side view of the invention complete. Fig. 3 is a top view of shaft B' and its power attachments. Fig. 4 shows sectional views of the winding-shaft, and also the spool-head $B^5$. Fig. 5 is a view of the twister C'. Fig. 6 is a detached view of the pulley $h$, showing manner of connection to spool-head $B^5$. Fig. 7 shows detached views of collar $c^4$, into which the twister C' is inserted. Fig. 8 is a view of the guide-rollers $d'$, through which the strands pass after being twisted. Fig. 9 is a top view of the cover of the twisters C'. Fig. 10 is a detail view of the shaft $B^2$ and the pulley $B^3$. Fig. 11 is a detached side view of the knife for cutting the twisted straw into pieces. Fig. 12 is a detached longitudinal sectional view of the pulley $B^3$ and shaft $B^2$.

Similar letters refer to similar parts in each figure.

A represents the wheels of the trucks of my invention, which are made low in order to accommodate the twisting mechanism to the thrashing-machine with which it may be run.

A' represents the frame, upon which is attached and arranged the mechanism of my invention.

B is the power-pulley, which is connected with the thrashing-machine or independent power, as the case may be, from which it receives its motion.

B' is the main shaft, which drives the machinery of this invention.

$B^2$ is a counter-shaft that drives the friction-pulley $B^3$, which in turn drives the large disk $B^4$ by revolving against its face. The disk $B^4$ is firmly connected, as hereinafter described, to one of the spool-heads $B^5$, and causes the spool to revolve fast or slow, according as the friction-pulley $B^3$ is revolved at the center or circumference of the disk $B^4$. The friction-pulley $B^3$ is a loose pulley and provided with a longitudinal groove 2, which engages the feather 1 upon the shaft $B^2$, (shown in Figs. 10 and 12,) so that it is easily moved back and forward upon the shaft $B^2$ and the face of the disk $B^4$ by the lever $j$. At the power end of the counter-shaft $B^2$ is attached a miter-pinion $B^6$, which meshes into a miter-gear $B^7$ upon the main shaft B', and through which the power is transmitted from the main shaft B' to the counter-shaft $B^2$. At the inner end of the main shaft B' is attached a large pinion $b$, (see Fig. 3,) which meshes in a large gear-wheel $b'$, located on the under side of the platform C, as shown by Fig. 3.

C represents the platform, upon which rest the twisting-funnels C' C' C', and this platform is revolved by the pinion $b$ upon the main shaft B', which meshes in the gear-wheel $b'$, which is attached to the under side of the platform C. The funnel-twisters C' C' C' are made of sheet or galvanized iron or other suitable material, tapering in form, being about two and one-half feet in diameter at the top and three inches at the bottom, and provided with a cover N, as shown by Fig. 9. At the top they are provided with wrought-iron collars $c^2$, and at the bottom they have the gear-wheels $c^3$ secured to them between their lower ends and the upper ends of the tubes 3. To the lower side of the hub of the gear $c^3$ and opposite the funnel C' is attached a short tube 3, which forms the lower end of the funnel C'. (See Fig. 5.) The tubes 3, which form the lower ends of the funnels C', are inserted into the sleeves $c^4$, (see Fig. 7,) which are attached to the platform C and extend downward therefrom. Between the gear-wheels $c^3$ is placed a gear-wheel $c^5$, which is attached to a vertical shaft $K^4$, having a bearing at the center of the platform C for its lower end, and its upper end journaled into the standard-bracket $c^6$. The gear-wheel $c^5$ remains stationary in relation to the wheels $c^3$, which revolve around it. The twisters C' C' C' are held in place and firmly supported by the wrought-iron frame $c^7$, to which are attached the traveling rollers $c^8$, which allow the twisters to turn easily. Upon the inside of the twisters C' C' C' are provided ribs in V shape $c^9$, which prevent hay or straw from turning in the funnels without twisting. Thus the turning of the shaft B' revolves the platform C through the pinion $b$, and the revolving of the platform turns the twisting-funnels C' in the same direction, and revolves each around the gear-wheel $c^5$, which remains stationary when the platform C is being revolved.

The gear-wheel $c^5$ being attached to the vertical shaft $K^4$, it and the shaft are held stationary while the platform $c$ is revolved around them by inserting an ordinary gib or key at the point $d^8$ of the bracket $c^6$.

Underneath the center of the platform C is placed a large sheet-iron cone P, as shown in Fig. 2, and beneath the point of this cone is placed a wide ring $d$, within which the strands or ropes of hay or straw are united and twisted into a large rope, (see Fig. 2,) which then passes between two concave rollers $d'$, which act as a guide and prevent the binding of the rope against the ring $d$, and causing it to draw hard. After passing the concave rollers $d'$ the rope passes on to the concave rollers $d^2$, which press the rope hard, and also act as a clutch, and pull the rope and strands from the twisters. The concave rollers $d^2$ have at one end gear-wheels 4, which intermesh, and the motion of the one is thereby transmitted to the other, but turning in opposite directions. These rollers are attached to the frame A' by a hanging bracket $d^3$. The upper roller has a shaft $d^4$ at its outer end, to which is attached a pulley $d^5$, connected to the power-shaft B' by a round belt $d^6$, which passes over a pulley $d^7$ on the power-shaft B', and thus the power from the shaft B' is transmitted to the concave rollers $d^2$. As the rope passes on from the rollers $d^2$ it passes between two concave guide-rollers $e'$ $e'$, which are journaled in the supporting-standard of the guide-lever $e^2$, and thence to and between two other concave guide-rollers $e^3$ $e^3$, attached to the outer end of the guide-lever $e^2$, and thence to the spool-shaft $b^2$, where it is wound into large rolls, which are preserved in this manner until desired for fuel, when it is cut off in proper lengths for fuel. The guide-lever $e^2$ is for the purpose of directing the winding of the rope upon the spool-shaft $b^2$, and is pivoted to the frame A' by a standard $e^4$, which carries the guide-rollers $e'$ $e'$, having an upright bolt $e^5$, which allows the guide-lever $e^2$ to rise as the spool is wound full. At the inner end of the guide-lever $e^2$ it has a longitudinal slot $e^6$, and in this slot is placed an upright bolt $e^7$, which extends downward into the screw-block $e^8$, which is moved from side to side of the frame A' by the screw-shaft $e^9$. The slot $e^6$ is for the purpose of allowing the lever $e^2$ to follow the screw-block $e^8$ as it passes back and forth upon the screw-shaft $e^9$.

If it is desired that the ropes as twisted shall be cut into long or short lengths, it is made to pass from the concave rollers $d^2$ to a guide-roller F, attached to the cross-piece F' of the frame A', on one side of which is attached a concave cutting-bar $F^2$, which forms one side of a shear for cutting off the rope. To the same side of the cross-bar F' of the frame A' is attached a cutting-lever $F^3$, which is fulcrumed to the cross-piece F', and provided with a sharp shear-blade to correspond with the cutting-bar $F^2$. This lever extends over the outside frame A' and is operated by hand.

In order to slack the speed of the rope while being cut by the lever $F^3$, the tightener-pulley handle $f^4$ is extended across the handle of the cutting-bar $F^3$, and as the cutting-bar handle is raised for the purpose of cutting the rope the tightener-pulley handle $f^4$ rises also and relieves the pressure upon the belt, and the concave rollers cease to run for the time required to cut the rope. When the rope is being cut, the spool $b^2$ is thrown out of gear by sliding the friction-pulley $B^3$ off its feather and allowing it to run loose upon the shaft $B^2$.

At the inner side of the spool-shaft $b^2$ is provided a coupling-shifter $g$, for operating the screw-shaft $e^9$. This shifter is made of wood or iron in triangular shape at its head, and the body is extended forward to cross-bar $g'$, and is provided with shoulders on each side at alternating points, and is kept in place by guide-brackets $g^2$ on the cross-bar $g'$. This coupling-shifter $g$ is placed against the rope wound upon the spool $b^2$, and as each successive layer is added the shifter $g$ is pushed backward the distance of one of the shoulders $g^3$ upon its body. These shoulders pass between two projections $g^4$ $g^4$ upon the coupling-rod $g^5$. As the shoulders pass the projections $g^4$ the coupling-rod $g^5$ is made to shift endwise from right to left or left to right of the frame A', and thus changes the clutch-coupling $g^6$ on the outer end of the screw-shaft $e^9$ from pulley $g^7$ to $g^8$, and vice versa, as often as a new layer of rope is wound on the spool $B^5$.

On one head $B^5$ of the spool is attached a short shaft carrying the pulley $h$, which connects with the screw-shaft pulleys $g^7$ and $g^8$ by belts, one being a cross-belt. The screw-shaft $e^9$ receives its power from the spool. The screw-shaft pulleys $g^7$ and $g^8$ are both loose pulleys and drive the screw-shaft $e^9$ only as the clutch $g^6$, which works upon a feather, is applied, and the shaft turns in opposite directions as the clutch is applied alternately to the pulleys $g^7$ and $g^8$, and carries the screw-block $e^8$ from end to end of the screw-shaft. The screw-block $e^8$ is loosely connected to the guide-lever $e^2$ and directs the winding of the rope upon the spool. Each of the spool-heads is provided with an opening $h'$ for the purpose of removing the spool-shaft $b^2$ when the spool is full and to insert another. The spool-shaft $b^2$ is held in place by a slide rigidly secured to the shaft $b^2$ and set-screw $h^3$, which binds against the edge of the slot $h'$ or other suitable fastening.

For the purpose of regulating the speed of the winding-spool to conform to the amount of rope on the spool and which must run slower as each successive layer is added, the large friction-disk $B^4$ has been provided with a friction-pulley $B^3$, which works on a feather 1, and is moved backward and forward upon the counter-shaft $B^2$ by the movement of the shifting-fork $j$. Upon the under side of the ratchet-wheel $j'$ is a gear-wheel $a$, (shown in dotted lines,) that meshes in the rack $j^2$ upon the stem of the shifting-fork $j$. The ratchet-wheel $j'$ is provided with two pawls $j^3$, one of which moves forward, the other backward, and move the ratchet-wheel continuously in the same direction. The pawls $j^3$ are operated by the slide $j^4$, which is mounted in brackets $j^5$ to the side pieces of the frame $A'$. The slide $j^4$ is operated by the screw-block $e^8$ striking against the end pieces $j^6$ as it reaches either end of the screw-shaft $e^9$. It will be seen that by this movement of the slide $j^4$ the pawls are made to work alternately upon the ratchet-wheel $j'$, which is in a horizontal position and is held in position by the bracket $j^7$.

When I desire to twist three small single strands (or more, as I do not confine the number of the twisting-funnels to three, as illustrated) of about two inches diameter, I disconnect the pinion $b$ upon the main shaft $B'$ from the large gear-wheel $b'$ and attach to the under side of the platform C a short shaft K, carrying a small gear-wheel $K'$, (see Fig. 3,) and attach the same to the main shaft $B'$ by means of the sleeve $K^2$ of the pinion $b$. This done, the platform C ceases to turn, the small gear-wheel $K'$ meshes with the gear-face $K^3$ upon the under side of the large gear-wheel $c^5$, situated in the midst of the twisting-funnels $C'$ $C'$ $C'$, and turns each of the twisters independently. The ropes so twisted pass through a series of guide-sheaves $K^5$, and are conducted to the guide-lever $e^2$, and through the guide-pulleys $e'$ and $e^3$ to the spool.

To connect the spool-head $B^5$ with the large friction-disk $B^4$, I use a short hollow shaft $o$, extending across the side piece of the frame $A'$ and provided with a collar $o'$ at each end, one of which is attached to the spool-head $B^5$ and the other to the disk $B^4$, (see Fig. 1,) and to connect the spool-head $B^5$ with the pulley $h$, I use a short hollow shaft extending across the side of the frame $A'$, and provided with a collar $o^2$ at one end and the pulley $h$ at the other, the collar being attached to the spool-head $B^5$ by bolts. (See Fig. 6.)

Having thus fully described and illustrated my invention, what I claim as new, and desire to secure by Letters Patent, is—

1. In a hay or straw twisting machine, the combination of the main frame, a revolving platform placed thereon and provided with a gear-wheel, a driving-shaft provided with a gear-wheel engaging the gear-wheel upon the revolving platform, funnels journaled in the platform, gear-wheels secured to their lower ends, and a stationary gear-wheel placed at the center of the circle described by the lower ends of the funnels, and with which the said gear-wheels secured to the funnels engage, whereby a rotary motion is imparted to the platform and funnels through the medium of the driving-shaft, substantially as shown and described.

2. In a machine for twisting straw into ropes, the combination of the main frame, the platform, one or more funnels journaled therein, gear-wheels secured to their lower ends, a gear-wheel journaled at the center of the platform which engages the gear-wheels on the ends of the funnels, a driving-shaft journaled in the frame, and a gear-wheel secured to the inner end of the shaft which engages the said gear-wheel at the center of the platform, whereby the platform remains stationary and the funnels revolve for producing single ropes, substantially as shown and described.

3. The combination of the frame, a revolving circular platform journaled thereon, a number of funnels in which the straw is placed, journaled in the revolving platform, gear-wheels secured to the lower ends of the funnels, a driving-shaft journaled in the frame, a gear-wheel secured to the inner end of the shaft, a gear-wheel secured to the circular platform engaging the said gear-wheel upon the shaft, and a stationary gear-wheel engaging the gear-wheels upon the lower ends of the funnels, an inverted conical guide or funnel secured to the frame approximately to the center of the circle described by the funnels for the purpose of bringing the several ropes from the funnels to a common point and twisting them together, and guiding-pulleys for supporting the twisted rope, substantially as set forth.

4. The combination of the frame, the revolving platform journaled thereon, a gear-wheel secured to it, the funnels journaled in the platform, gear-wheels secured to lower ends of the funnels, a stationary gear-wheel engaging the said gear-wheels, a driving-shaft journaled in the frame, a gear-wheel upon its inner end engaging the platform gear-wheel, an inverted cone placed below the revolving platform, guiding-pulleys $d'$, the rollers $d^2$, between which the rope passes, pulley $d^7$ upon the driving-shaft, the pulley $d^5$, secured to one end of one of the rollers, and the belt $d^6$, whereby the rope is automatically drawn from the funnels as rapidly as finished, substantially as specified.

5. The combination of the frame, the revolving platform, a gear-wheel secured thereto, a driving-shaft provided with a gear-wheel upon its inner end engaging the platform gear-wheel, a number of funnels journaled in the platform, gear-wheels upon their lower ends, a stationary gear-wheel placed at the center of the circle described by the funnels and engaging the gear-wheels secured thereto, the inverted cone placed below the funnels, the guiding-pulleys $d'$ and rollers $d^2$, between which the rope passes, the pulleys $d^7$ $d^5$, belt $d^6$, the stationary knife $F^2$, and pivoted knife $F^3$, and the arms $f^4$, pivoted to the frame $A'$, tightening-pulley secured to its free end for engaging the belt and having its opposite end engaged by the pivoted handle of the knife $F^3$, whereby when the knife-blade is forced downward to sever the rope by raising the handle upward the belt $d^6$ is loosened and the rollers $d^2$ stopped, for the purpose described.

6. In a machine for twisting hay and straw into ropes, the combination, with revolving funnels for twisting the material into ropes, of a winding mechanism consisting of a receiving spool or shaft, a friction-disk secured thereto, a counter-shaft driven by the main shaft, a sliding friction-pulley upon said shaft engaging the said friction-disk, a pivoted guiding-lever, through which the rope passes, a ratchet-wheel, a sliding bar carrying ratchets which engage and revolve the ratchet-wheel, a revolving screw-shaft, a screw-block thereon which engages the sliding bar and moves it back and forth, and also the inner end of the guiding-lever, a shifter having one end to engage the rope upon the spool, and which is moved endwise by the accumulation of rope thereon, a sliding bar engaging the opposite end of the said shifter, and clutches upon the end of the screw-shaft, whereby the revolution of the shaft is reversed alternately by the movement of the shifter, a gear-wheel secured to the ratchet-wheel, and a fork engaging the said gear-wheel, and the sliding friction-pulley for moving it along its shaft and across the face of the friction-disk, for the purpose substantially as shown and described.

7. The combination, in a machine for twisting straw into ropes, of the frame, the revolving platform, the funnels journaled therein, the driving-shaft for revolving the platform by means of gear-wheels, the counter-shaft driven by the driving-shaft, guiding-rollers for the rope, the spool upon which the twisted rope is wound, the guiding-lever pivoted to the frame and through which the rope passes, a screw-shaft, a screw-block placed upon the shaft and engaging the inner end of the guiding-lever, the coupling-shifter $g^5$, clutch-pulleys $g^7$ $g^8$, and coupling $g^6$, placed upon one end of the screw-shaft, the shifter $g$, having shoulders $g^3$, which engage the projections $g^4$ upon the coupling-shifter $g^5$ as it is forced inward, the ratchet-wheel $j'$, carrying a gear-wheel, the shifting-fork $j$, having one end to engage the pulley $B^3$ and its opposite end formed into a rack and engaging the gear-wheel, and the sliding bar $j^4$, provided with pawls for operating the ratchet-wheel, and with projections at each end, with which the screw-block engages at each end of its movement upon the screw-rod, the pulley $B^3$, and friction-disk $B^4$, all combined to operate in the manner substantially as shown and described.

8. In a hay or straw twisting machine, the combination of the main frame, a revolving platform placed thereon and provided with a gear-wheel, a driving-shaft provided with a gear-wheel engaging the gear-wheel upon the revolving platform, a suitable number of funnels journaled in the platform, gear-wheels secured to their lower ends, and a stationary gear-wheel placed at the center of the platform, and with which the said gear-wheels secured to the funnels engage, and radial arms within the funnels for preventing the straw from turning with them, for the purpose substantially as specified.

In testimony whereof I have affixed my signature in presence of two witnesses.

LAWRENCE SULLIVAN.

Witnesses:
WILL C. REED,
C. F. DINSMORE.